Sept. 17, 1968  H. GRÄSVOLL  3,401,811
DEVICE FOR UNLOADING PIECES OF GOODS FROM A PALLET
AND THEIR TRANSFER TO A CONVEYOR
Filed July 20, 1967  5 Sheets-Sheet 1

Halvor Gräsvoll INVENTOR

BY Wenderoth, Lind &
Ponack, Attorneys

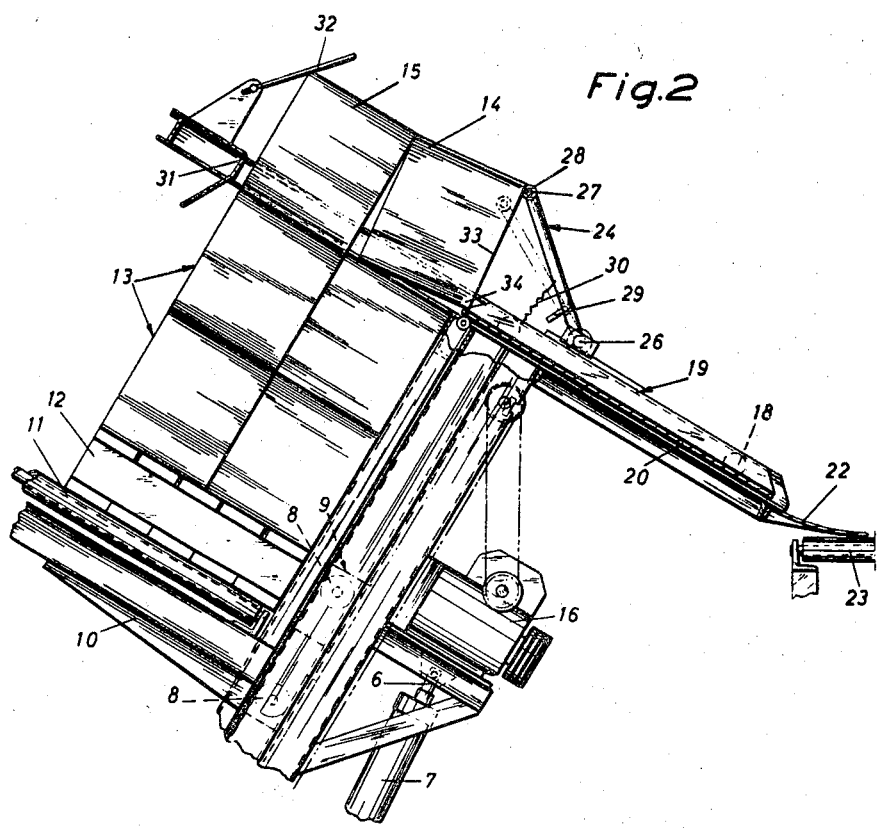

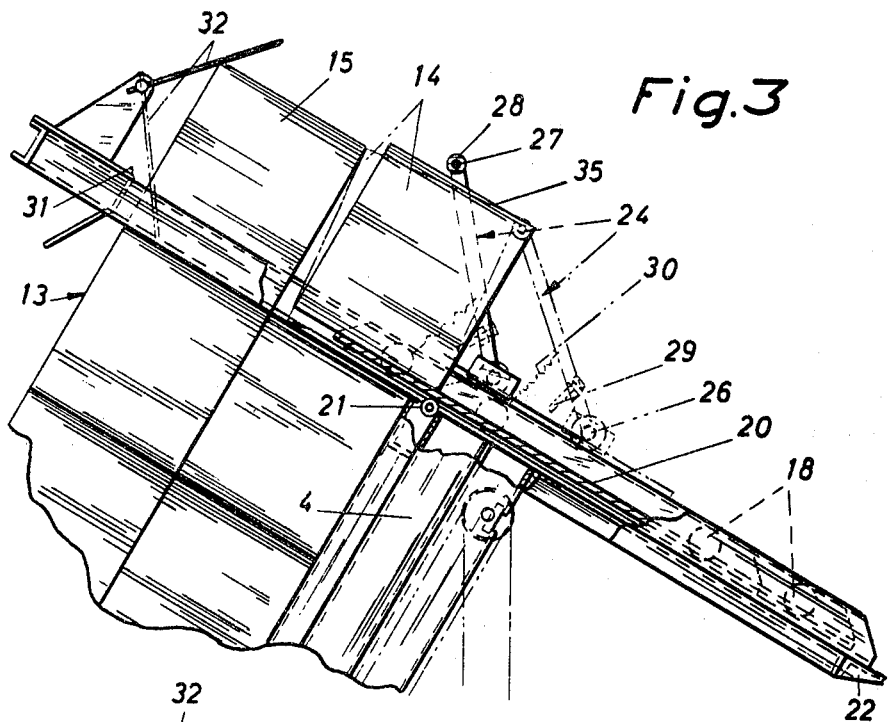
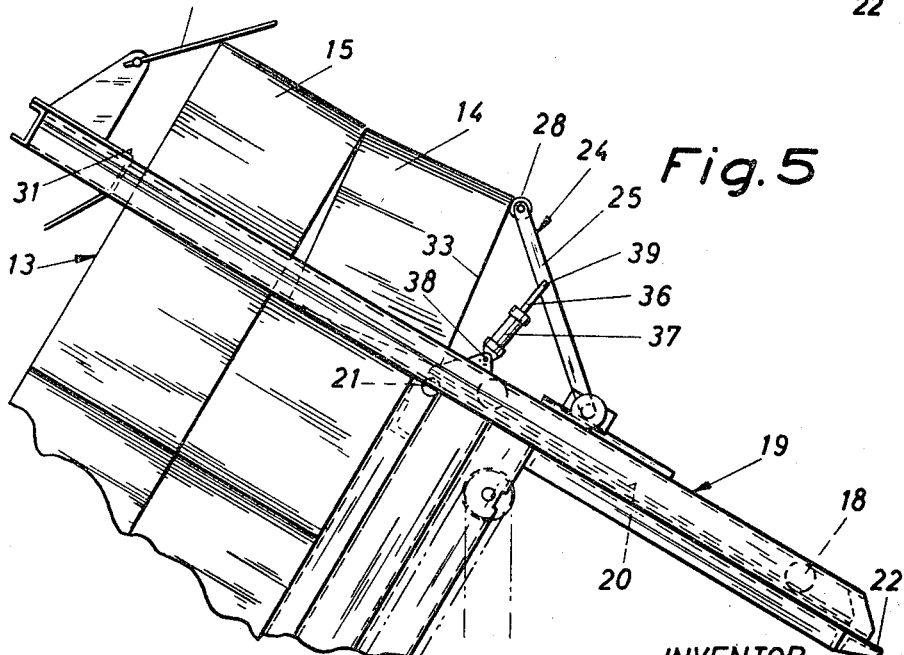

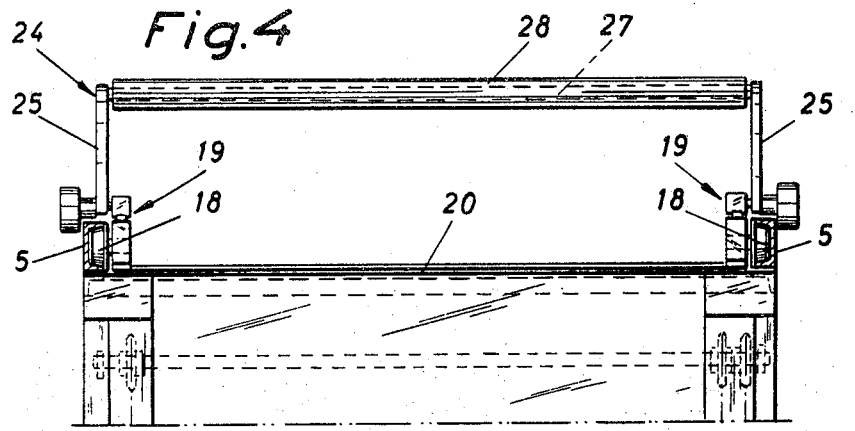
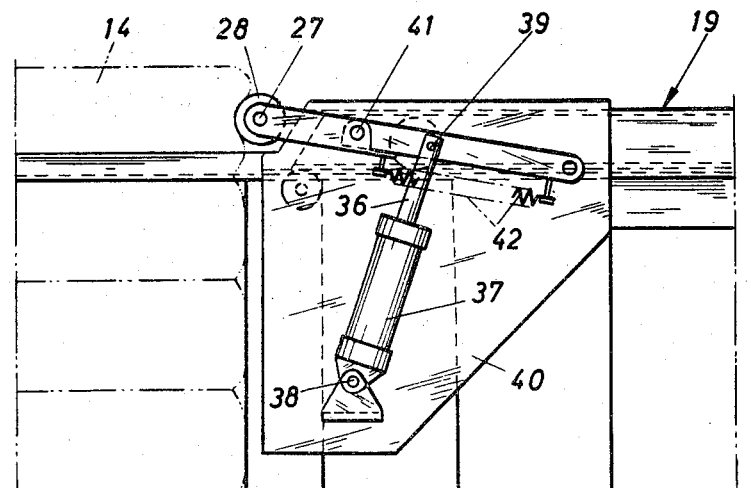

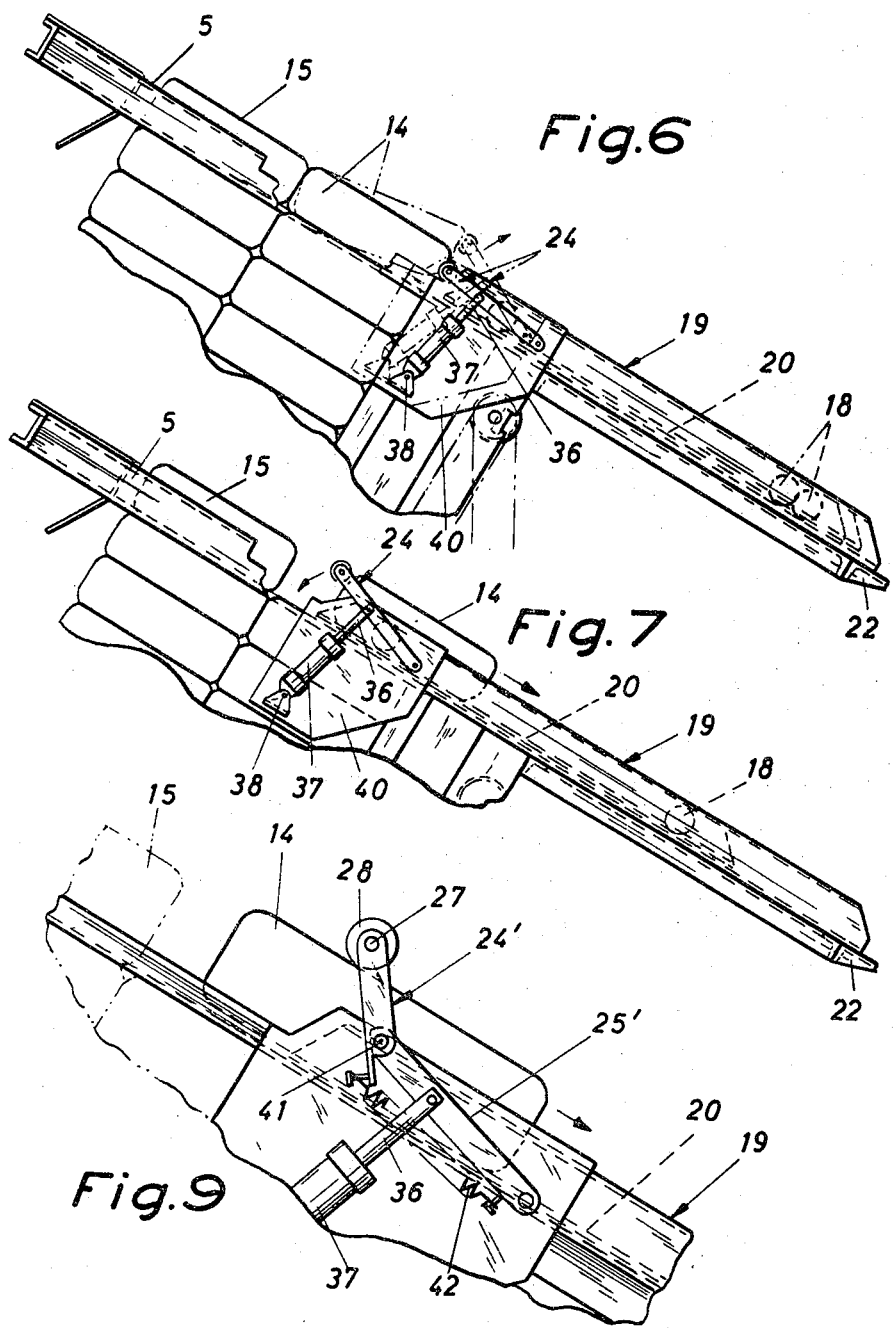

United States Patent Office 3,401,811
Patented Sept. 17, 1968

3,401,811
DEVICE FOR UNLOADING PIECES OF GOODS FROM A PALLET AND THEIR TRANSFER TO A CONVEYOR
Halvor Gräsvoll, Goteborg, Sweden, assignor of one-third each to Gustav Gilbert Magnusson and Karl Ingvar Weiner, both of Goteborg, Sweden
Filed July 20, 1967, Ser. No. 654,740
Claims priority, application Sweden, Sept. 5, 1966, 11,912/66
8 Claims. (Cl. 214—8.5)

ABSTRACT OF THE DISCLOSURE

The present invention has reference to a device for unloading pieces of goods from a pallet and the transfer of the same to a conveyor, this device ensuring a careful treatment of the pieces of goods thereby that it is provided with a specially shaped means for separating the pieces of goods to be transferred.

---

Figure 1:
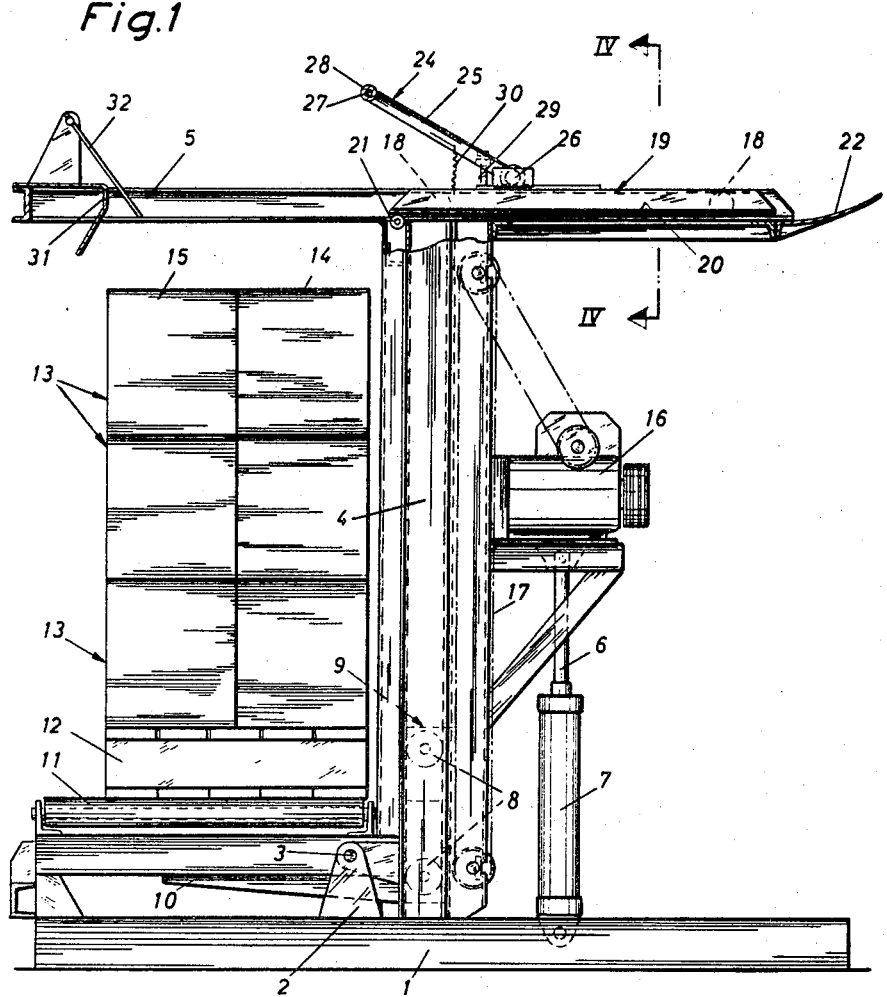

The present invention refers to a device for unloading of pieces of goods such as boxes, cages, bags and similar parcels from a pallet and for their transfer to a conveyor or the like. The device comprises a lifting carriage movable up and down in a stand portion, the latter being swingable in a vertical plane and adapted to lift the pallet step by step to unloading position for the pieces of goods carried by the pallet, the device also comprising means for separating the parcels or pieces of goods.

The main feature of the invention is to be seen therein that a plate is displaceable in over the pallet, said plate provided with an abutment means adapted, at the displacement of the plate, to be pressed against the foremost pieces of goods situated closest to the front border of the same against the front side of said pieces near their upper border so as to force the pieces of goods to tilt upwardly and rearwardly to such an extent that the front border of the disk be pushed in under these pieces of goods. Such a device makes it possible to unload boxes and cases as well as bags. The treatment will be very careful. The unloading and separation of the goods pieces is carried out automatically in one single operation phase.

In the following the invention will be elucidated with reference had to the accompanying drawings. In the drawings:

FIG. 1 is a vertical longitudinal section through an unloading device according to the invention with its stand portion and the lifting carriage in vertical position, FIG. 2 is a similar vertical section with the stand portion and the lifting carriage in horizontal position for unloading operation, FIG. 3 shows a similar section as the one in FIG. 2 but with the separation means in a more advanced position, FIG. 4 shows a cross section through the device on the line IV—IV in FIG. 1, FIG. 5 is a side elevation of the upper portion of the unloading device but provided with a separating means according to another embodiment of the invention, FIGS. 6 and 7 are views similar to the one in FIG. 5 but provided with a separating means intended for the unloading of bags, and FIGS. 8 and 9 show a separating means according to a further embodiment of the invention.

On the lower portion of the stand comprising a bottom frame 1 and a lug 2, there is journalled a guide frame 4 about a horizontal shaft 3 by means of its lower end, said guide frame 4 provided with a top piece 5 having lateral guides. The frame 4 with the top piece 5 is by means of a hydraulically or pneumatically driven piston-cylinder unit 6, 7 swingable from a vertical position (FIG. 1) to an inclining position (FIG. 2) and back to the initial position. The frame 4 is provided with lateral guides for the running rollers 8 of a lifting carriage 9, the latter provided with a bracket 10 with a rolling path 11 for pallets 12 carrying pieces of goods 14, 15 arranged in layers 13. It is by means of an electric motor 16 possible to lift, by means of chains 17 or other motion transmitting means, in steps the lifting carriage 9 with the pallet 12 and the pieces of goods 14 and 15 resting on them.

The guides on the top pieces 5 are adapted for running rollers 18 on an unloading carriage 19 which by means of a hydraulically or pneumatically driven piston-cylinder unit or another power device (not shown) is displaceable from one end position (farmost to the right in FIG. 1) in which the unloading carriage 19 is situated out of the path of the pieces of goods 14, 15 during the lifting of the same by means of the lifting carriage 9 to the upper position (unloading position). The unloading carriage 19 is provided with a bottom plate 20 on which the pieces of goods 14, 15 slide during the unloading. The plate is carried at its front border by a roller 21 extending across the whole of the plate and the top plate 5 carries at the rear end a rail 22 preferably comprising an elastic material, e.g. rubber, the pieces of goods 14, 15 sliding over this rail to a conveyor 23 at the unloading (FIG. 2).

The unloading carriage 19 is at its front end provided with a bow 24 which with its branches 25 is journalled about horizontal studs 26 carried on the carriage 19. The transverse part 27 of the bow 24 extends over the whole of the unloading carriage 19 and is provided with a rotatable roller or sleeve 28. The inclination of the bow can be changed by means of an adjustment screw 29 which is journalled in one branch 25 of the bow 24. A helical spring 30 which is arranged between the carriage 19 and the bow branch 25 tends to retain the bow 24 in its adjusted position.

Reference numeral 31 denotes a grate on the top piece 5 and reference numeral 32 denotes an impulse generator.

The device functions in the following manner. A pallet 12 fully loaded by rather high boxes 14 and 15 is moved over to the roller path 11. The guide frame 4 with the top piece 5 and all the portions arranged on this unit are brought to assume an inclining position by means of the hydraulic piston-cylinder unit 6, 7 (FIG. 2). The electric motor 16 is started, and then the lifting carriage 9 lifts the pallet 12 with the boxes 14, 15 until the upper layer 13 of such boxes swings the impulse generator 32 on the grate 31 on the top piece 5 in counterclockwise direction according to FIG. 2 whereby the feeding of current to the engine 16 is interrupted and the lifting of the lifting carriage 9 ceases. At the same time an impulse is given to the driving means for the unloading carriage 19 with the bow 24 acting as an abutment means obliquely upwards to the left direction according to FIG. 2. The bow part 27 then abuts with the sleeve 28 against the side 33 of the box 14 turned towards said sleeve near the upper border of the box in such a way that the box be tilted upwards, rearwards such that the lower front box corner 34 is lifted. At a continued displacement of the lifting carriage 19 obliquely upwards according to FIG. 2 the front border of the plate 20 slides in under the box 14 simultaneously as the bow 24 due to the pressing of the box 14 against the box 15 is swung in clockwise direction according to FIG. 2 and thus the roller 28 will thereafter slide on the upper side 35 of the box 14. The inclination of the stand portion 4 and thus also of the lifting carriage 19 in operation position (FIG. 2) is chosen in such a way that when the roller 28, as explained in the aforegoing, slides up on the upper side 35 of the box 14, the latter by gravity slides down on the plate 20 and via the rail 22 is transferred to the conveyor 23. Due to the roller 28 the friction is reduced between the bow 24 and the upper side 35 of the box. As soon as the box 14 has slid away from the roller 28, the bow 24 is swung by gravity and under intermediary of the tension of the spring 30 back to the initial position (shown with dash and dot lines in FIG. 2) and when the roller 28 at the continued displacement of the carriage 19 obliquely upwards to the left abuts against the front side 33 of the box 15, the latter is tilted in a corresponding manner upwards and rearwards. The box 15 is then prevented, by the grate 31, from being displaced rearwardly. When the plate 20 has been moved sufficiently in under the box 15, also the latter slides down on the plate 20 and further over the rail 22 to the roller path 23. When the unloading carriage 19 has returned to its initial position (FIG. 2), the pallet 12 is lifted further one step, and then the next layer 13 of boxes 14, 15 is unloaded in the way described in the aforegoing.

In the embodiment shown in FIG. 5, the spring 30 has been replaced by a piston cylinder unit 36, 37 driven hydraulically or pneumatically, the cylinder 37 by means of a spud 38 journalled on the unloading carriage 19 and the piston 36 being by means of a spud 39 journalled on one branch 25 of the bow 24.

When the roller 28 has forced the box 14 to tilt upwards and rearwards and the plate 20 with its rear border has reached in under the box, the piston cylinder 36, 37 forces the bow 24 to swing in clockwise direction in such a way that the roller 28 does no longer contact the box 14. After a certain time during which the box 14 has slid sufficiently far down on the plate 20, the piston cylinder unit 36, 37 swings the bow 24 back to the initial position in such a way that the roller 28 is ready, at the continued displacement of the unloading carriage 19 obliquely upwards to the left, to abut against the front side of the box 15.

The embodiment shown in FIGS. 6 and 7 of the abutment means is intended for unloading of bags. This means corresponds principally to the means shown in FIG. 5 but the stud 38 has according to FIGS. 6 and 7 had to be arranged on a much lower level on a downwards directed side piece 40 on the unloading carriage 19.

So as to render possible the returning of the piston-cylinder unit 36, 37 to its initial position immediately after that the bow 24 has been swung up to a position above the boxes, the branches 25' of the bow 24' have, according to FIGS. 8 and 9, been provided with hinges 41. Helical springs 42 tend to return the bow part 27 provided with the roller 28 to the initial position (FIG. 8) as soon as the goods pieces 14 situated there below have slid away on the plate 20.

The invention has been described in the aforegoing for purposes of illustration only and is not intended to be limited by this description or otherwise except as defined in the appended claims. Thus, many modifications could be carried out without departure from the inventive idea and e.g. the piston-cylinder units may be replaced by other power means such as electric means. The same applies also for the motor 16 which may be replaced by another power means, The lifting carriage 9 and the unloading carriage 19 may be replaced by a slide or the like.

What I claim is:

1. A device for unloading of pieces of goods from a pallet (12) and the transfer of the same to a conveyor (23) or the like, said device comprising a lifting carriage (9) which is displaceable up and down in a stand portion (4, 5) which is swingable in a vertical plane and adapted to lift the pallet step by step to unloading positions for the pieces of goods (14, 15), said device also comprising a means for separating said pieces of goods (14, 15), wherein the improvement comprises shaping the separating means as a plate (20) displaceable in over the pallet (12), said plate (20) provided with an abutment means (24) which is adapted, at the displacement of said plate (20), to be pressed against the front side (33) of one of the pieces of goods situated closest to said plate in the vicinity of the upper border of said pieces of goods so as thereby to force the pieces of goods to tilt upwards and rearwards to such an extent that the front border of the plate be moved in under said pieces of goods.

2. A device as claimed in claim 1, wherein the improvement comprises shaping the abutment means of a bow (24) journalled with its branches (25) on the plate (20).

3. A device as claimed in claim 1, wherein the improvement comprises arranging the abutment means to be swung upwards after the pressing against the pieces of goods (14, 15) such that it can pass freely above the same.

4. A device as claimed in claim 1, wherein the improvement comprises arranging the abutment means to be swung upwards against the action of a springing means (30) after the pressing against the pieces of goods (14, 15) such that it can pass freely above the same.

5. A device as claimed in claim 1, wherein the improvement comprises arranging the abutment means to be swung upwards by the action of a hydraulic piston-cylinder unit (36, 37) after the pressing against the pieces of goods (14, 15) such that it can pass freely above the same.

6. A device as claimed in claim 1, wherein the improvement comprises arranging the abutment means to be swung upwards by the action of a pneumatic piston-cylinder unit (36, 37) after the pressing against the pieces of goods (14, 15) such that it can pass freely above the same.

7. A device as claimed in claim 1, wherein the improvement comprises shaping the abutment means of a bow (24') journalled with its branches (25') on the plate (20), said branches (25') of the bow (24') provided with joints (41) for rendering possible a swinging up of the bow part (27) situated between the branches irrespective of the position of the branches.

8. A device as claimed in claim 1, wherein the improvement comprises shaping the abutment means of a bow (24') journalled with its branches (25') on the plate (20), the transverse part (27) of the bow (24') provided with a roller or a sleeve (28) so as to reduce the friction against the pieces of goods (14, 15).

References Cited

UNITED STATES PATENTS 1,907,457   5/1933   Stevenson _____ 214—8.5 X

FOREIGN PATENTS 191,500   9/1964   Sweden.

GERALD M. FORLENZA, *Primary Examiner.*

G. F. ABRAHAM, *Assistant Examiner.*